United States Patent [19]

Sakurada et al.

[11] 4,149,795
[45] Apr. 17, 1979

[54] DIGITAL INFORMATION TRANSMITTING AND DISPLAYING SYSTEM FOR A PHOTOGRAPHIC CAMERA

[75] Inventors: Nobuaki Sakurada, Yokohama; Yukio Mashimo; Nobuhiko Shinoda, both of Tokyo; Tadashi Ito; Fumio Ito, both of Yokohama, all of Japan

[73] Assignee: Canon Kabushiki Kaisha, Tokyo, Japan

[21] Appl. No.: 771,481

[22] Filed: Feb. 24, 1977

Related U.S. Application Data

[63] Continuation of Ser. No. 600,430, Jul. 30, 1975, abandoned.

[30] Foreign Application Priority Data

Aug. 7, 1974 [JP] Japan .................................. 49-90599
Oct. 31, 1974 [JP] Japan .................................. 49-126013

[51] Int. Cl.² .......................... G03B 7/08; G03B 17/20
[52] U.S. Cl. .................................. 354/23 D; 354/53; 354/60 L; 340/802
[58] Field of Search .................... 354/23 D, 53, 60 A, 354/60 L; 340/336

[56] References Cited

U.S. PATENT DOCUMENTS 3,879,723 4/1975 Hornung .............................. 340/336
3,909,137 9/1975 Kisanuki ............................ 354/23 D Primary Examiner—Russell E. Adams
Attorney, Agent, or Firm—Toren, McGeady and Stanger

[57] ABSTRACT

A digital information transmitting and displaying system for a photographic camera in which a plurality of electric signals bearing respective digits, or symbols or combinations thereof constituting a photographic information, such as an exposure value, are transmitted in sequence through a common channel from a camera control circuit device to a digital read-out device arranged to be visible in the view finder of the camera.

10 Claims, 8 Drawing Figures

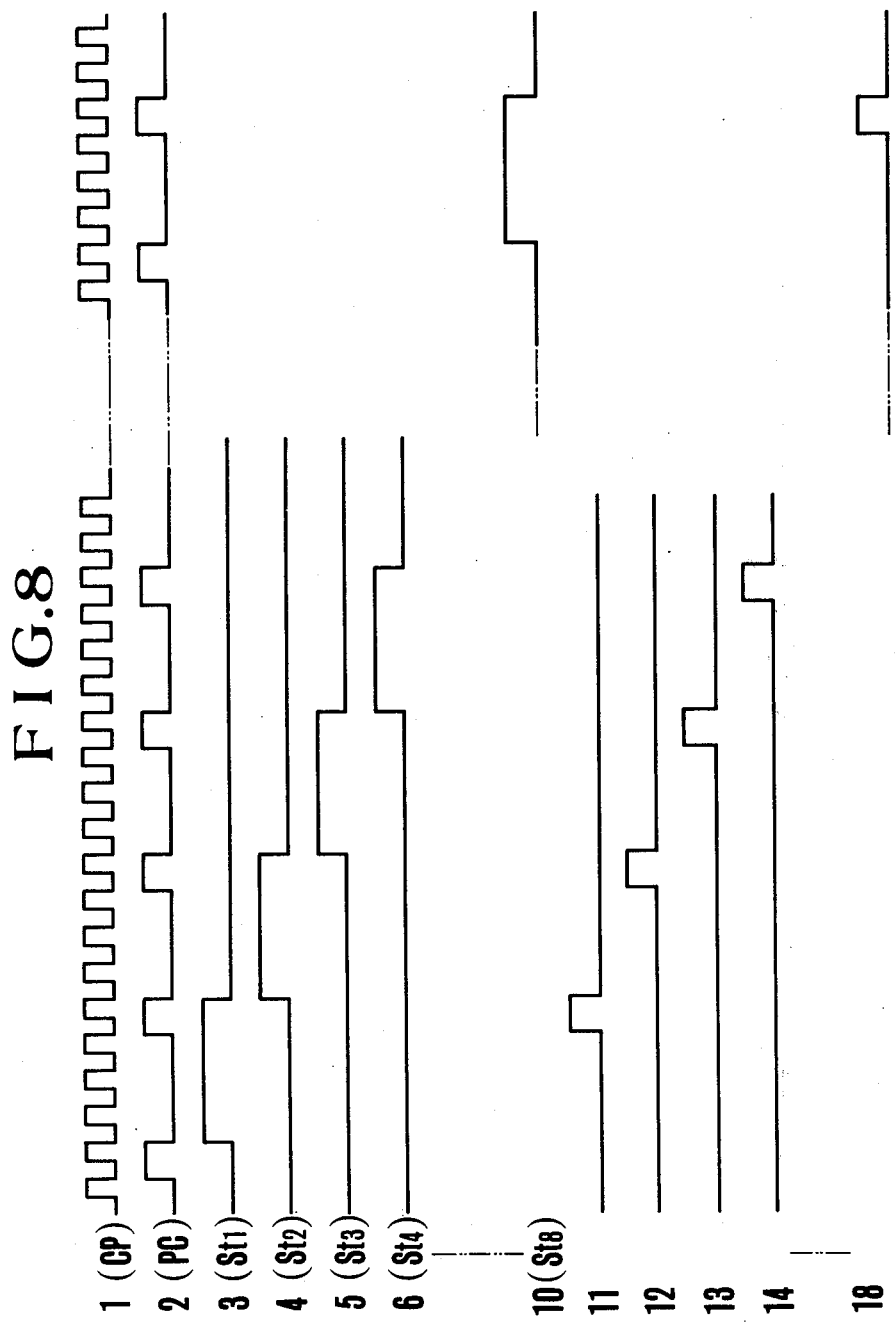

DIGITAL INFORMATION TRANSMITTING AND DISPLAYING SYSTEM FOR A PHOTOGRAPHIC CAMERA

This is a continuation of application Ser. No. 600,430 filed July 30, 1975, now abandoned.

BACKGROUND OF THE INVENTION

1. Field of the Invention

This invention relates to digital exposure information display systems for use with photographic cameras or exposure meters, and more particularly to a digital exposure information transmitting and displaying system for use with a digitally operated camera or exposure meter in which a digital exposure information once stored in a digital circuit of the camera or exposure meter is transmitted to a read-out device for digital display of the exposure information in the view finder of the camera.

2. Description of the Prior Art

With recent development of electronics, digital circuit devices have found their uses in the exposure control of photographic cameras. The employment of the digital circuit device in the exposure control apparatus provides various advantages such as of simplifying the circuit structure, reducing the apparatus size and improving the control accuracy. These advantages are very important factors in facilitating the compactness of the camera. With such digital exposure control apparatus, it is required that the display device for displaying exposure information such an exposure value be associated with the digital circuit device. For this reason, various types of digital display systems have been developed, most of which may be conveniently considered as comprising a number of memory means for memorizing the corresponding number of digits or symbols constituting a single exposure information or exposure value supplied from the exposure control apparatus of the camera, and read-out means connected to the memory means through respective signal-transmitting channels. As the number of digits increases, therefore, the necessary number of channels is increased, thereby giving a disadvantage of prejudicing the small, compact and rugged construction of the digital circuit device. Another disadvantage of the prior art display systems is that, in order to display the exposure information in the field of view of the camera, the read-out means with the channel means must be positioned in a limited space within the view finder optical system with the consequent sacrificing of the economical production of a complete camera.

SUMMARY OF THE INVENTION

An object of the present invention is to provide an exposure information transmitting and displaying system adapted for association with a digitally operated exposure control apparatus of a photographic camera and which has overcome the above mentioned conventional drawbacks.

Another object is to provide an exposure information transmitting and displaying system comprising a number of memory means for storing the corresponding number of digits, or symbols, or combinations thereof which when sequentially arranged in a predetermined order constitute the numeral of an effective exposure value, a pulse counter, the corresponding number of AND gates having first inputs connected to the respective memory means and having second inputs connected to respective stages of the counter, and a single OR gate connected to the AND gates to permit sequential transmission of the corresponding number of signals each having a place-control components through a common channel to decoding means associated with read-out means, so that the digits are displayed as rearranged in accordance with the place-control components of the signals in the view finder of the camera.

Still another object is to provide an exposure information transmitting and displaying system of the character described in which when said digits are applied in sequence through the common channel to the read-out means, the sequence of application of said digits is controlled in conformance with the predetermined display arrangement thereof to permit the use of signals having no place-control components in transmitting the exposure information to the read-out means.

According to a preferred embodiment of the invention, the memory means, pulse counter, AND gates and OR gate are assembled in a common semiconductor device as a first LSI chip, while the display means including decoding means is constructed in the form of a second LSI chip adapted for arrangement adjacent the optical system of the view finder of the camera, thereby it being made possible to connect these first and second LSI chips with each other through a minimized number of electrically insulated lead wires.

An advantage of the present invention deriving from the minimization in the necessary number of insulated wires interconnecting the first and second LSI circuits is that the design flexibility allowing camera structures of reduced size is not dependent upon the particular arrangement of the first and second LSI chips, permitting effective utilization of the spaces available in these structures within the camera housing for facilitating the compactness of the camera with a decreased weight and bulk thereof. The present invention is, therefore, preferably applicable to a high performance camera which is comparatively small, compact and rugged in construction.

BRIEF DESCRIPTION OF THE DRAWINGS

FIG. 8 is a pulse timing chart illustrating an example of the manner in which the system of FIG. 7 may be operated.

DESCRIPTION OF THE PREFERRED EMBODIMENT

Figure 1:
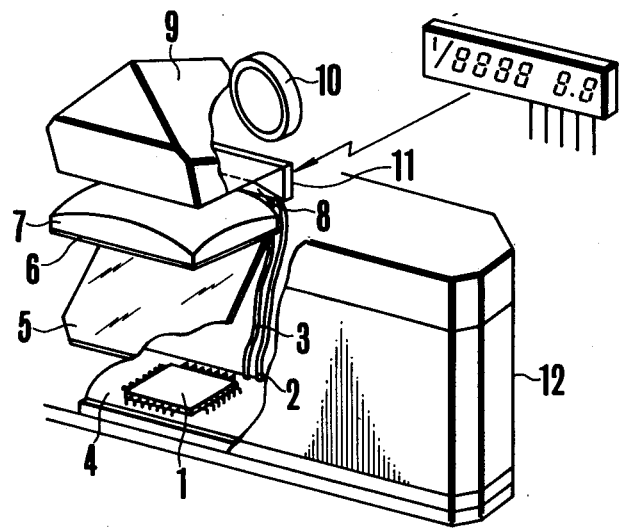
FIG. 1 is a fragmentary schematic perspective view, partly broken away, of an arrangement of the essential components of an exposure information transmitting and displaying system according to a preferred embodiment of the present invention as applied to a single lens reflex camera.
Figure 2:
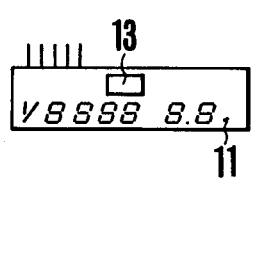
FIG. 2 is an enlarged elevational view of a digital read-out device suitable for use in the system of FIG. 1.
Figure 3:
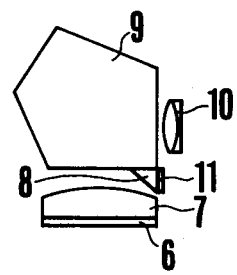
FIG. 3 is a side sectional view of the basic components of a view finder optical system illustrated in connection with an arrangement of the read-out device of FIG. 2.
Figure 4:
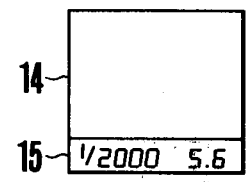
FIG. 4 is a plane view of the image of an exposure information representing character arrangement appearing to a photographer looking through the eyepiece of the view finder of FIG. 3.

Referring to FIGS. 1 through 4, there is shown one embodiment of an exposure information transmitting and displaying apparatus according to the present invention as applied to a single lens reflex camera having a housing 12. The apparatus comprises an exposure information-to-signal converting circuit including a digital signal transmitting circuit incorporated in a first large scale integrated circuit (LSI) chip 1, a number of terminals 2 connected to the chip 1, and the corresponding number of insulated lead wires 3 connected at one ends thereof to the respective terminals 2, the opposite ends of which are connected to a display control circuit including decoders, drivers, shift registers incorporated in a second LSI chip 13 mounted on a read-out device such as of the seven segment type as shown in FIG. 2. The read-out device 11 is positioned adjacent a prism 8 attached to the bottom face of a penta prism 9 at the rear marginal portion thereof constituting part of a view finder optical system of the camera. As shown in FIG. 3, the view finder optical system further includes a tiltable mirror 5, a focusing screen 6, a condenser lens 7 and an eye-piece 10. A view field of the finder appearing to a photographer looking through the eye-piece 10 is shown in FIG. 4, as being comprised of an image area 14 to be photographed and an exposure value indicia-display area 15.

Figure 5:
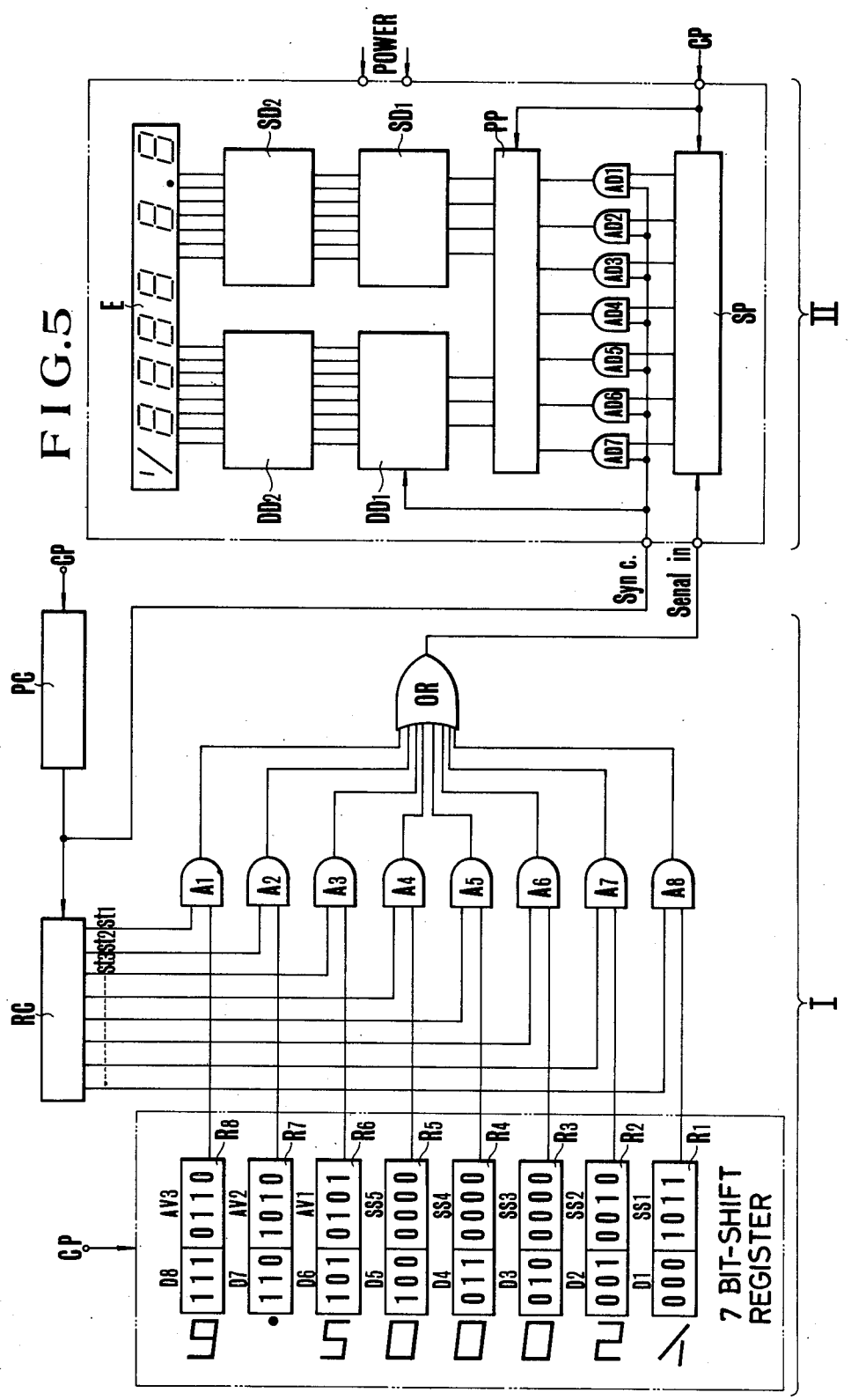
FIG. 5 is a schematic diagram, partly in block form, of circuitry suitable for use in an example of an exposure information transmitting and displaying the system according to one embodiment of the present invention.

Referring now to FIG. 5, there is shown one embodiment of an exposure information transmitting and displaying system according to the present invention as including a clock pulse generator CP which may be common to that of a digitally operated exposure control system of the camera, a control counter PC such as a ripple type connected to the clock pulse generator CP, a scale-of-8 ring counter RC connected to the ripple counter PC, eight 7 bit-shift registers $R_1$ through $R_8$ with the registers $R_1$ through $R_5$ being responsive to binary coded signals constituting an effective shutter speed supplied from the exposure control system, and with the registers $R_6$ through $R_8$ being responsive to binary coded signals constituting an effective aperture value, eight AND gates $A_1$ through $A_8$ having gating control inputs connected to respective stages of the ring counter RC and having signal inputs connected to the respective outputs of the shift registers $R_1$ through $R_8$, and a single OR gate OR connected to the outputs of the AND gates $A_1$ through $A_8$. These components PC, RC, R, A and OR are assembled as a single first unit I. Each of the 7 bit-shift registers $R_1$ through $R_8$ is so constructed that the first three bits generally designated by character D serve to register a place control signal, and the other four bits generally designated by character SS or AV serve to register numeral or symbol control signal. For example, the first 7 bit-shift register $R_1$ has the first three bits $D_1$ adapted to register a binary coded signal (0, 0, 0) representative of the first place and the other four bits $SS_1$ adapted to register a binary coded signal (1, 0, 1, 1) indicative representative of a symbol "1/" indicating whether or not the shutter speed is longer or shorter than one second. The combination of registers $R_2$ through $R_5$ is adapted to represent a shutter speed in 4 digit decimal number at large, while the combination of registers $R_6$ through $R_8$ is adapted to represent an aperture value in 2 digit decimal number.

The system of FIG. 5 further includes a 7 bit-shift register SP having an input connected to the output of the OR gate OR of the first unit I, seven AND gates $AD_1$ through $AD_7$ having signal inputs connected to the respective bits of the shift register SP and gating control inputs connected to the output of the ripple counter PC of the first unit I, a 7 bit register PP connected to the outputs of the AND gates $AD_1$ through $AD_7$, a digit decoder $DD_1$ connected to the first three bits of the register PP and having a control input connected to the ripple counter PC, a segment decoder $SD_1$ connected to the other four bits of the register PP, a digit driver $DD_2$ responsive to the place control signal supplied from the digit decoder $DD_1$ for selecting one of eight read-out elements and for driving the selected read-out element, a segment driver $SD_2$ responsive to an indicium control signal supplied from the segment decoder $SD_1$ for selecting certain segments from the seven ones or a fixed number of segments in the above-identified read-out element and for driving the selected segments to display any one of the ten digits from 0 to 9 and two symbols "1/" and "." (decimal point), and a read-out element assembly E with eight read-out elements arranged in laterally side-by-side relation. These components SP, AD, PP, $DD_1$, $DD_2$, $SD_1$, $SD_2$ and E may be assembled in a single second unit II.

It will be appreciated that the binary coded signals supplied from the 7 bit shift registers $R_1$ through $R_8$ are transmitted in sequence throught a common channel to the read-out element assembly E, while the sequential signal transmission is controlled by the ripple or control counter PC of scale-of-7 type through a separate channel. One set of indicia including the ten digits and symbols "1/" and "." of which the ten digits can be produced by the seven segments of the read-out element is exemplified in connection with binary coded signals for the place control and indicium control as shown in the following tables 1 and 2.

Table 1

| Place | 1 | 2 | 3 | 4 | 5 | 6 | 7 | 8 |
|---|---|---|---|---|---|---|---|---|
| Indicium | 1/ | ╔ | ╔ | ╔ | ╔ | ╔ | | ╔ |
| Register with first three bits | $D_1$ | $D_2$ | $D_3$ | $D_4$ | $D_5$ | $D_6$ | $D_7$ | $D_8$ |

Table 2

| Place control signal | | | Binary code of signal | Indicium control signal Indicium | | |
|---|---|---|---|---|---|---|
| Register bit | Binary code of signal | Place | | Register $SS_2$-$SS_5$ $AV_1$, $AV_3$ | Register $SS_1$ | Register $AV_2$ |
| $D_1$ | 0 0 0 | 1st | 0000 | ╔ | | |
| $D_2$ | 0 0 1 | 2nd | 0001 | | | |
| $D_3$ | 0 1 0 | 3rd | 0010 | ╔ | | |

Table 2-continued

| Place control signal | | | Binary code of signal | Indicium control signal Indicium | | |
|---|---|---|---|---|---|---|
| Register bit | Binary code of signal | Place | | Register $SS_2$–$SS_5$ $AV_1$, $AV_3$ | Register $SS_1$ | Register $AV_2$ |
| $D_4$ | 0 1 1 | 4th | 0011 | | | |
| $D_5$ | 1 0 0 | 5th | 0100 | | | |
| $D_6$ | 1 0 1 | 6th | 0101 | | | |
| $D_7$ | 1 1 0 | 7th | 0110 | | | |
| $D_8$ | 1 1 1 | 8th | 0111 | | | |
| | | | 1000 | | | |
| | | | 1001 | | | |
| | | | 1010 | | | Decimal point. |
| | | | 1011 | | Symbol 1/ | |
| | | | 1100 | | | |
| | | | 1101 | | | |
| | | | 1110 | | | |
| | | | 1111 | blank | blank | blank |

Figure 6:
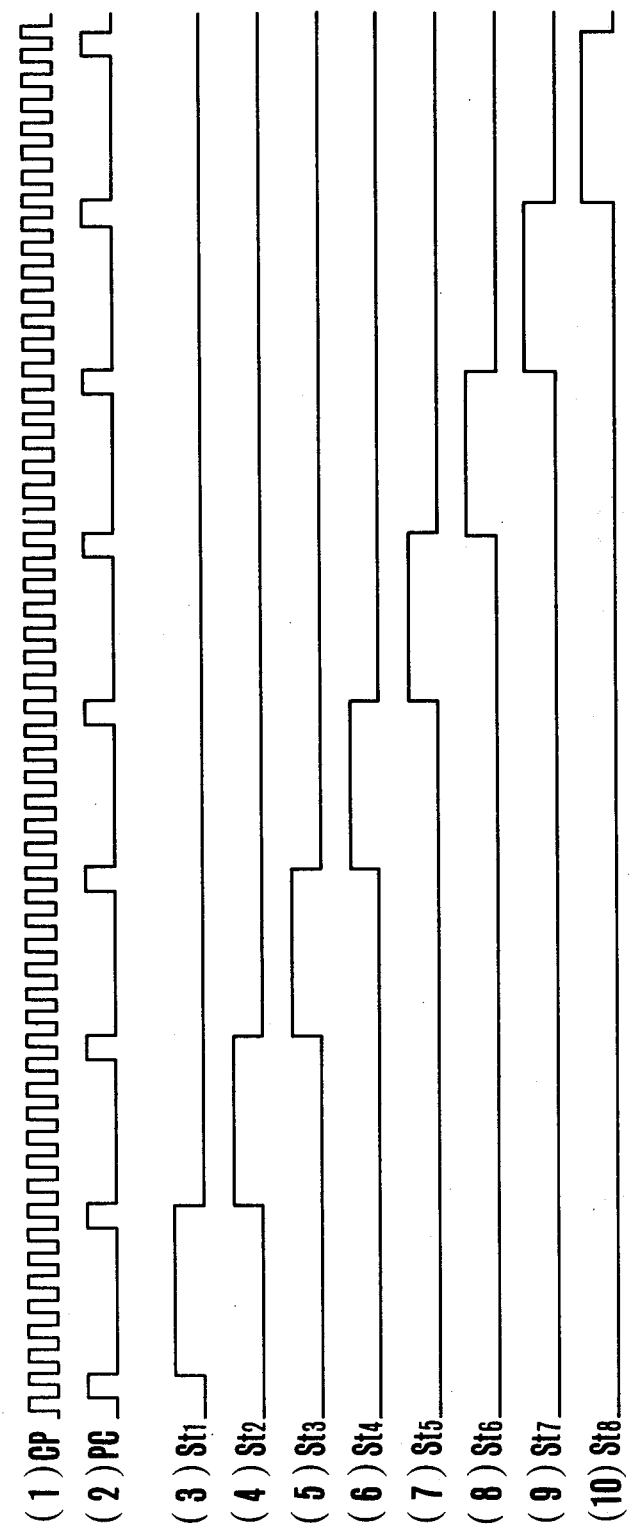
FIG. 6 is a pulse timing chart illustrating an example of the manner in which the system of FIG. 5 may be operated.

The operation of the system of FIG. 5 will be understood with reference to FIG. 6, wherein a line (1) shows a clock pulse train from the clock pulse generator CP, a line (2) shows the conductivity conditions of the scale-of7 ripple counter PC, and lines (3) through (10) show the conductivity conditions of the respective stage $St_1$ through $St_8$ of the scale-of-8 ring counter RC. The shift registers $R_1$ through $R_8$ are now assumed to be in positions for registering an exposure information of a shutter speed of 1/2000 and an aperture value of 5.6 supplied from the exposure control system not shown of the camera. When a clock pulse train at line (1) is applied to the control or ripple counter PC, the ripple counter produces a pulse train at a pulse repetition rate 1/7 times that of the clock pulse train, as shown at line (2). Responsive to a first control pulse counting from the left as viewed in FIG. 6(2), the ring counter RC produces a strove pulse $St_1$ at line (3) in such a manner that the lagging edge of the first control pulse from the ripple counter PC coincides with the leading edge of the strove pulse $St_1$. During the time the strove pulse $St_1$ of duration 7 times the time interval between the successive two clock pulses is applied to the gating control input of a first AND gate $A_1$, the first AND gate $A_1$ is gated on to pass a combined signal of a place control binary coded signal (1, 1, 1) representative of the eighth place and an indicium control binary coded signal (0, 1, 1, 0) from the shift register $R_8$, which is then applied through the OR gate and a channel designated by Senal In to the 7 bit-shift register SP of the second unit II. When all of the AND gates $AD_1$ through $AD_7$ of the second unit II are gated on in response to application of a second control pulse at line (2) of which the lagging edge coincides with the lagging edge of the strove pulse $St_1$, the place control signal is applied to the digit decoder $DD_1$ through register PP, and the indicium control signal is applied to the segment decoder $SD_1$ through the register PP. Responsive to the binary code (1, 1, 1) of the place control signal, the digit decoder $DD_1$ causes the digit driver $DD_2$ to drive the eighth read-out element counting from the left in the read-out element assembly or device E. On the other hand, responsive to the binary code (0, 1, 1, 0) of the indicium control signal, the segment decoder $SD_1$ causes the segment driver $SD_2$ to drive six of the seven segments of the eighth read-out element, thereby a numeral "6" is displayed in the eighth place of the read-out device E. At a moment all of the AND gates $AD_1$ through $AD_7$ are set to the "off" condition, a second strove pulse $St_2$ is applied to the second AND gate $A_2$ of the first unit I, so that a combined signal representative of the decimal point from the shift register $R_7$ is transmitted to and displayed by the seventh read-out element in the read-out device E in a manner similar to that shown in connection with the display of the eighth place numeral "6." The other binary coded signals from the shift registers $R_6$ through $R_1$ are likewise transmitted to the respective read-out elements, thereby the indicia 1/2000 and 5.6 are displayed by the read-out device E which can be viewed by the photographer looking through the view finder of the camera.

DESCRIPTION OF AN ALTERNATE EMBODIMENT

Figure 7:
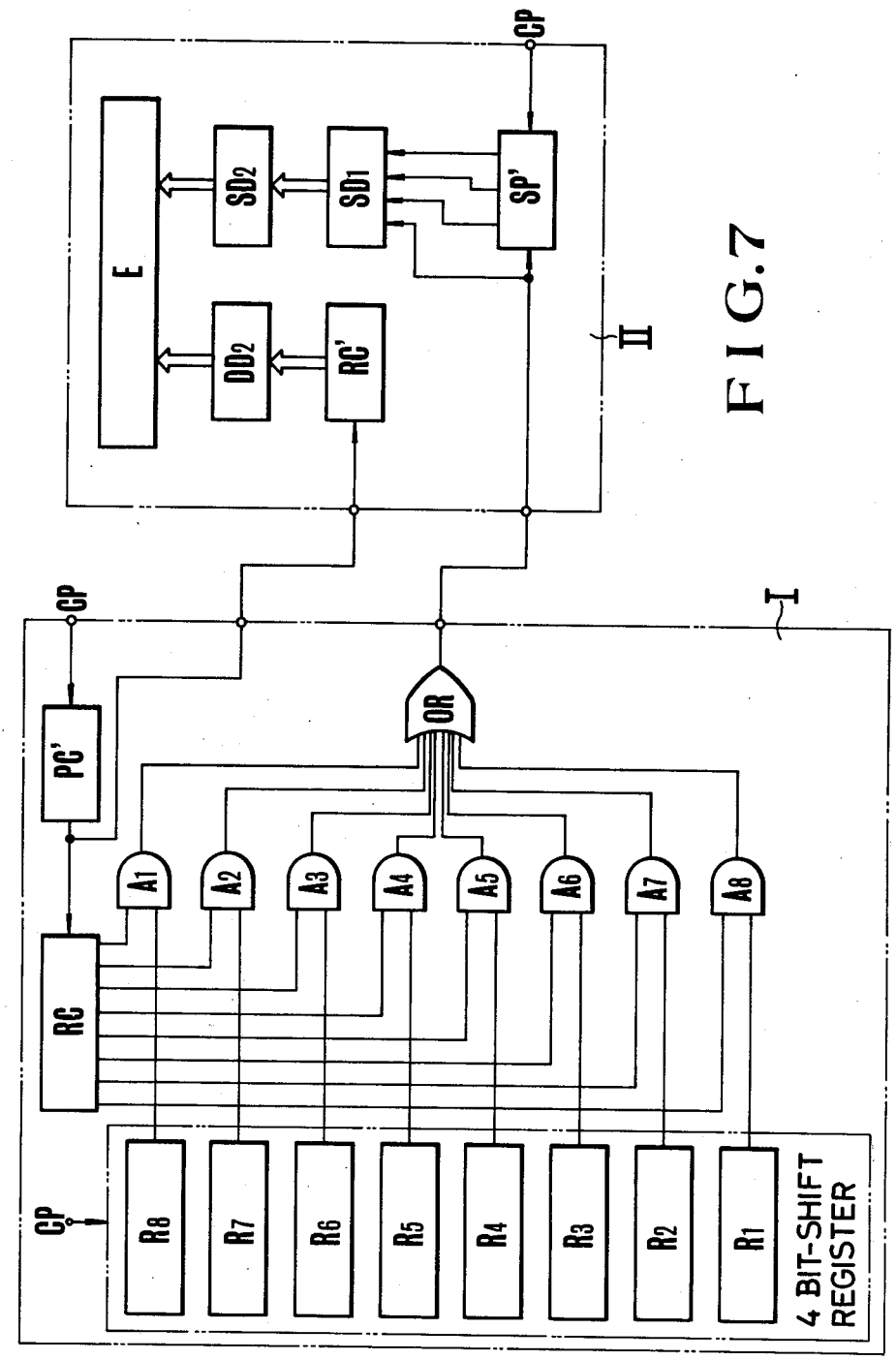
FIG. 7 is a schematic diagram, partly in block form, of circuitry suitable for use in another example of the embodiment of the invention.

An alternate embodiment of this invention for transmitting a number of indicia constituting a single exposure information in the form of the corresponding number of binary coded signals having no place control components through a common channel to respective read-out elements, while the sequential transmission of the signals to the read-out elements respectively assigned thereto being controlled by use of an additional ring counter is illustrated in FIG. 7, and the conductivity conditions of the additional ring counter are illustrated in FIG. 8. The same reference characters are employed in that figure to denote parts of that embodiment of the invention which remain substantially unchanged from the embodiment illustrated in FIG. 5, and the same reference characters primed are employed to denote similar parts thereof with slight modification.

Referring now to FIG. 7, an exposure information transmitting and displaying system is shown as comprising a scale-of-4 ripple counter PC' having a clock pulse input terminal CP, a first scale-of-8 ring counter RC connected to the ripple counter PC', eight AND gates $A_1$ through $A_8$ having gating control inputs connected to respective stages of the ring counter RC, eight 4 bit-shift registers $R_1'$ through $R_8'$ connected to respective signal inputs of the AND gate assembly A, an OR gate OR connected to the outputs of the AND gate assembly A, all of the above mentioned parts being assembled as a first unit I, a 3 bit-shift register SP' of a second unit II connected through a single channel to the output of the OR gate of the first unit I, the register SP' having a function of processing the sequential signals supplied from the first unit I in synchronism with the clock pulses at line (1) in FIG. 8 to produce parallel outputs, a segment decoder $SD_1$ having four inputs one of which connected to the output of the OR gate OR and the other three of which are connected to the respective bits of the register SP', a seven-segment driver $SD_2$ responsive to the output of the segment decoder $SD_1$ for selecting certain segments from the seven segments, or a fixed number of segments in a selected read-out element of a read-out device E and for driving the selected segments to display any one of the ten digits from 0 to 9 and two symbols "1/" and "." (decimal point), a second scale-of-8 ring counter RC' connected to the scale-of-4 ripple counter PC' for producing place-control signals at lines (10) through (18) in synchronism with the driving sequence of the AND gates $A_1$ through $A_8$, and a digit driver $DD_2$ responsive to the place control signal supplied from the second ring counter RC' for selecting one of the eight read-out elements in the read-out device E and for driving the selected read-out element.

The operation of the system of FIG. 7 is as follows. A camera control system not shown, applies digital coded signals such as binary coded signals to the shift registers $R_1'$ through $R_8'$. Each of these signals is representative of any one of the ten digits 0 to 9, or a symbol "1/" or "." (decimal point). Responsive to a clock pulse train applied to the input terminal CP, the ripple counter PC' produces a pulse train at a pulse repitation rate $\frac{1}{4}$ times that of the clock pulse train, as shown at line (2) in FIG. 8, which is then applied to the first ring counter RC to produce pulses $St_1$ through $St_8$ in sequence in synchronism at the leading edges thereof with the lagging edges of the pulses of the ripple counter PC', as shown at lines (3) through (10) respectively. Assuming that the register $R_8$ registers a binary code (0, 1, 1, 0) representative of a numeral "6," a binary coded signal (0, 1, 1, 0) is derived from the register $R_8$ in a time interval during which four clock pulses are applied to the ripple counter PC', as the AND gate $A_1$ is set in the "on" condition by the strove pulse $St_1$. Next, the strove pulse $St_2$ gates on the AND gate $A_2$ to derive a binary coded signal, for example, (1, 0, 1, 0) representative of the decimal point. Such a procedure is repeated each time a control pulse is produced from the ripple counter PC' to derive binary coded signals from all of the registers $R_1$ through $R_8$. These signals are transmitted in sequence through the OR gate and a common channel from the first unit I to the second unit II. In the second unit II, the binary coded signals are applied in sequence to the 3 bit-shift register SP', while the application of the four components of each binary coded signal, for example, (0, 1, 1, 0) of $R_8$ to the register SP' are synchronized with occurrence of the clock pulses. Upon application of the fourth component, in this instance, "0" to the register SP', the second ring counter RC' causes the digit driver $DD_2$ to drive the read-out element in the eighth place in the read-out device E, thereby a numeral "6" is displayed by the read-out element through the segment driver $SD_2$ after the output of the register SP' is decoded by the segment decoder $SD_1$. Such a procedure is repeated each time a pulse is produced from the second ring counter RC' in sequence as shown at lines (11) through (18). As a result, a complete exposure information is displayed by the read-out device E in the form of an arrangement of digits, or symbols, or combinations thereof.

The present invention has been described in connection with the two embodiments in which the registers are employed as the memory means. Instead of using this type of memory means, it is possible to use magnetic type memory means. Further, instead of using these static memory mean, it is possible to use dynamic memory means. Moreover, the above-described embodiments of the invention is illustrated as applied to a single lens reflex camera. But the system of the invention is applicable to digitally operated exposure meters constructed in the separate form from the camera, or to external display apparatus adapted for attachment to the camera body from the outside thereof.

What is claimed is:

1. A display apparatus for a camera comprising:
   (a) a display information transmitting circuit provided in a camera main body which is integrated in one chip and includes:
      (1) a plurality of registers, each one of which has a display information memorizing part to memorize a digital value so as to represent photographing information value and a display means designating information memorizing part to memorize a digital value representing display means designating information for designating a predetermined one of segment display means; some of said registers memorizing a digital value corresponding to a shutter time value in said display information memorizing part and some of said registers memorizing a digital value corresponding to an aperture value in said display information memorizing part;
      (2) a serial output circuit for serially providing as an output the digital value memorized in said register, said circuit designating each of registers in time series and serially providing as an output the digital value memorized in the designated register; and
      (3) an output terminal connected to an output terminal of said serial output circuit whereby said registers are designated in time sequence to serially provide as an output the content thereof;
   (b) a display circuit provided near a camera finder, and a display control circuit integrally constructed with said display circuit on one chip, said display control circuit including:
      (1) an input terminal;
      (2) a register means connected to said input terminal for providing parallel output of the serial input;
      (3) a first conversion circuit connected to said register means to convert the digital value representing the said display means designation information into the display means designation signal; and
      (4) a second conversion circuit connected to said register means to convert said digital value representing the photographing information value into another coded signal for display, and said display circuit including a plurality of segment display means which are designated by designation signal from said first conversion circuit and designated segment display means displays a number or symbol on the coded signal from said second conversion circuit; and
   (c) a single data bus line connected between the output terminal of said display information transmitting circuit and an input terminal of said display control circuit.

2. A display apparatus for a camera comprising:

(a) a display information transmission circuit provided at a dark box portion of a main camera body, which apparatus is integrated into a single chip, including:
  (1) a plurality of registers, each one of which has a display information memorizing part to memorize the digital value representing photographing information and a display means designating informaton memorizing part to memorize the digital value representing a display means designating information to designate a segment display means; some of said registers memorizing a digital value corresponding to a shutter time value in said display information memorizing part and some of said registers memorizing a digital value corresponding to an aperture value in said display information memorizing part;
  (2) gate means provided at an output terminal of each of said registers; and
  (3) a signal transmission means to transmit in sequence a signal to said gate means in time series, wherein said transmission means impresses the signal on each one of the gate means in time series so as to provide as an output the content of each register in time series, wherein said display information transmission circuit has an output terminal connected to said output of said signal transmission means, whereby the content of each register is serially provided as an output from the display information transmission circuit in time series;
(b) a display control circuit integrated in one chip, including:
  (1) an input terminal;
  (2) a parallel output register connected to said input terminal to memorize the data provided serially from the said display information transmission circuit and to provide the same as parallel output information;
  (3) a digit decoder to designate a prescribed display means based on the digital value representing said display means designating information being transmitted to the parallel output register; and
  (4) a segment decoder to convert the photographing information transmitted to the parallel output register into a display code based on the digital value representing said photographing information;
(c) a display circuit provided near a finder constructed with said display control circuit including a plurality of segment display means, which are designated by the output of the digit decoder, wherein said designated segment display means displays a number of symbols based on the output of said segment decoder; and
(d) a single data bus line connected between the input terminal of the display control circuit and the output terminal of the display information transmission circuit.

3. A display apparatus according to claim 2, in which said display circuit is provided at a pentagonal prism part of a finder.

4. A display apparatus for a camera comprising:
(a) a first integrated circuit provided at a dark box portion of a camera main body, including:
  (1) a plurality of registers, each register comprising a photographing information memorizing bit part for memorizing the digital value corresponding to photographing information and a display means designating information memorizing bit part for memorizing the digital value corresponding to designating information to designate a segment display means for displaying said photographing information, the memorized content being serially provided as an output by clock pulses; some of said registers memorizing a digital value corresponding to a shutter time value in said photographing information memorizing bit part and some of said registers memorizing a digital value corresponding to an aperture value in said photographing information memorizing bit part;
  (2) a plurality of gate means, said gate means being connected to a serial output terminal of each register;
  (3) a first counting circuit to count said clock pulses and to provide a single pulse after counting a prescribed number of pulses; and
  (4) a second counting circuit coupled to said first counting circuit, wherein said second counting circuit has a plurality of output terminals connected respectively to prescribed gate means, varying the output state in response to the input of said single pulse from said first counting circuit and generating an output from prescribed output terminals, whereby said gate means are changed over in sequence every time a single pulse is generated and are placed in an opened state for a prescribed period of time, thus the content of each register is serially provided at an output terminal of said first integrated circuit as an output;
(b) a second integrated circuit, including:
  (1) an input terminal;
  (2) a parallel output register coupled to said input terminal to memorize serial input from input terminal and generate parallel output;
  (3) a gate means provided at each output terminal of the parallel output register, wherein said gate means is opened in response to the single pulse from said first counting circuit to output the content of the parallel output register;
  (4) a memory register for memorizing the content of said parallel output register, said memory register coupled to said parallel output register through said gate means;
  (5) a selection means to select a segment display means based on digital value corresponding to the said designating information being provided at the memory register; and
  (6) a conversion means to make conversion into display digital value based on a digital value corresponding to said photographing information which is provided at the memory register;
(c) a plurality of segment display means provided near a pentagonal prism part and being constructed with said second integrated circuit which is designated by said selection means wherein the designated segment display means displays the information based on the output of said conversion means; and
(d) a data bus line connected between the output terminal of said first integrated circuit and the input terminal of said second integrated circuit.

5. A display apparatus according to claim 4, in which said first counting circuit is a ripple counter.

6. A display apparatus according to claim 5, in which said second counting circuit is a shift register.

7. A display apparatus according to claim 4, in which said selection means is a digit decoder.

8. A display apparatus according to claim 7, in which said conversion means is a segment decoder.

9. A display apparatus according to claim 4, in which said segment display means is a seven segment type.

10. A display apparatus for a camera comprising:
(a) a first integrated circuit provided at a dark box portion of a camera main body, including:
   (1) a plurality of registers, each register having a serial output terminal and memorizing a digital value corresponding to one figure number, the content of some of the registers providing a shutter time value for displaying the shutter time value, the content of some of the registers providing an aperture value for displaying the aperture value, and the memorized content of register being serially provided an output in response to a clock pulse;
   (2) a plurality of gate means, said gate means being connected to the serial output terminal of said register;
   (3) a first counting circuit to count said clock pulse and to provide a single pulse after counting a prescribed number of pulses periodically; and
   (4) a second counting circuit coupled to said first counting circuit, said second counting circuit having a plurality of output terminals connected respectively to prescribed means, said second counting circuit varying the output state in response to the input of said single pulse from said first counting circuit and generating an output from a prescribed output terminal, whereby said gate means are changed over in sequence every time a single pulse is generated and are placed in an opened state for a prescribed period of time, thus the content of each register is serially provided at an output terminal of said first integrated circuit as an output;
(b) a second integrated circuit, including:
   (1) an input terminal;
   (2) a parallel output register coupled to said input terminal to memorize serial input information from an input terminal and generate parallel output information;
   (3) a third counting circuit for counting said single pulse and changing the content of third counting circuit when the single pulse is counted;
   (4) a selection means to select a segment display means based on the content of said third counting circuit; and
   (5) a conversion means to make conversion into display digital value based on a digital value corresponding to one figure number which is provided at the parallel output register;
(c) a display circuit provided near a pentagonal prism part comprising a plurality of segment display means being constructed with said second integrated circuit, each segment display means being designated in response to the content of said selection means and said designated segment display means which displays one figure number based on the display digital value from said conversion means; and
(d) a data bus line connected between the output terminal of said first integrated circuit and the input terminal of said second integrated circuit.

* * * * *